United States Patent

Wu

[11] Patent Number: 5,904,405
[45] Date of Patent: May 18, 1999

[54] PILLOW STRUCTURE FOR CHAIRS

[76] Inventor: Frank Wu, 6F-2, No. 6, Lane 712 Chun-Hsiao Rd., Nantze Dist. Kaohsiung, Taiwan

[21] Appl. No.: 09/131,193

[22] Filed: Aug. 7, 1998

[51] Int. Cl.[6] .................. B60N 2/42; B60N 2/48
[52] U.S. Cl. ............... 297/391; 297/216.12; 297/464; 297/468
[58] Field of Search .................. 297/391, 216.12, 297/184.12, 184.13, 393, 408, 464, 468, 475, 487

[56] References Cited

U.S. PATENT DOCUMENTS

| | | | |
|---|---|---|---|
| 2,873,122 | 2/1959 | Peras | 297/216.12 X |
| 3,098,128 | 7/1963 | Audin | 297/391 X |
| 3,372,491 | 3/1968 | Morrison | 297/391 X |
| 3,376,064 | 4/1968 | Jackson | 297/391 |
| 4,565,405 | 1/1986 | Mayer | 297/391 X |
| 4,971,393 | 11/1990 | Maisenhalder | 297/391 |
| 5,411,468 | 5/1995 | Chen | 297/391 X |
| 5,806,933 | 9/1998 | Tsui et al. | 297/216.12 X |

FOREIGN PATENT DOCUMENTS 3829470  10/1989  Germany ................ 297/391

*Primary Examiner*—Peter R. Brown
*Attorney, Agent, or Firm*—Bacon & Thomas, PLLC

[57] ABSTRACT

A pillow structure includes a main pillow adjustably mounted to a chair and two side pillows respectively mounted two sides of the main pillow and extending in a direction transverse to the main pillow. Each side pillow includes an extension telescopically received therein and slidable along the extending direction of an associated side pillow.

10 Claims, 2 Drawing Sheets

PILLOW STRUCTURE FOR CHAIRS

BACKGROUND OF THE INVENTION

1. Field of the Invention

The present invention relates to a pillow structure for chairs that may protect and provide comfort support for the user.

2. Description of the Related Art

Some of chairs for vehicles have a pillow mounted to an upper part thereof to support the user's head. Yet, the user's neck still can be injured if a sudden turn, emergency stop, or even a crash occurs. Although expensive air bags have been proposed, the user still might be injured if the neck is moved and twisted suddenly. The present invention is intended to provide an improved pillow structure to solve these problems.

SUMMARY OF THE INVENTION

It is a primary object of the present invention to provide an inexpensive pillow structure to provide a comfort support to the user's head.

A pillow structure for a chair in accordance with the present invention comprises a main pillow member adjustably mounted to the chair and two side pillows respectively mounted two sides of the main pillow and extending in a direction transverse to the main pillow.

The main pillow includes a rod securely mounted to each of two sides thereof each rod having a non-circular portion. Each side pillow includes an end for securely engaging with the non-circular portion of an associated rod. Each side pillow may include a frame covered by a soft material.

Preferably, each side pillow extends in a direction having an angle of 80°~100° with a longitudinal axis of the main pillow.

In a preferred embodiment of the invention, each side pillow includes an extension telescopically received therein and slidable along the extending direction of an associated side pillow. Each side pillow includes a compartment for telescopically receiving an associated extension. A lateral wall that defines the compartment includes a plurality of protrusions formed thereon, while the associated extension includes a depression selectively engaged with one of the protrusions for retaining the associated extension in position.

One of the side pillows may include a reel mounted thereon. The reel includes a spindle therein and a belt wound therearound. The belt includes an end securely attached to the spindle and a distal end with a hook. The other of the side pillows includes a retaining slot defined therein for releasably engaging with the hook of the belt. The reel further includes a returning means mounted around the spindle for returning the belt when the hook is disengaged from the retaining slot. The belt may be transparent or made of light-tight material.

In an alternative embodiment of the invention, the reel and the belt are provided on one of the extensions, while the retaining slot is provided on the other extension.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
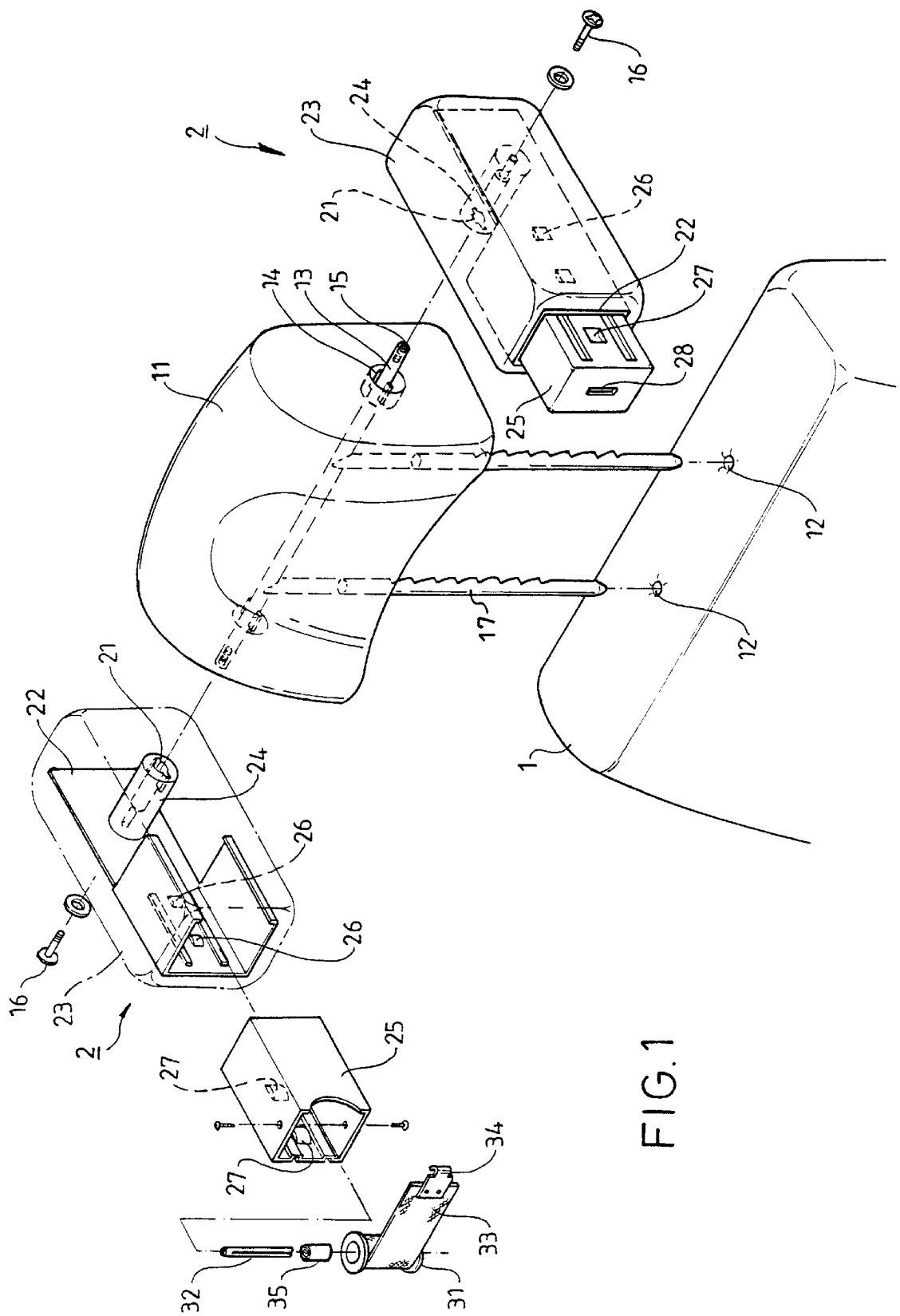
FIG. 1 is an exploded perspective view of a pillow structure for chairs in accordance with the present invention.
Figure 2:
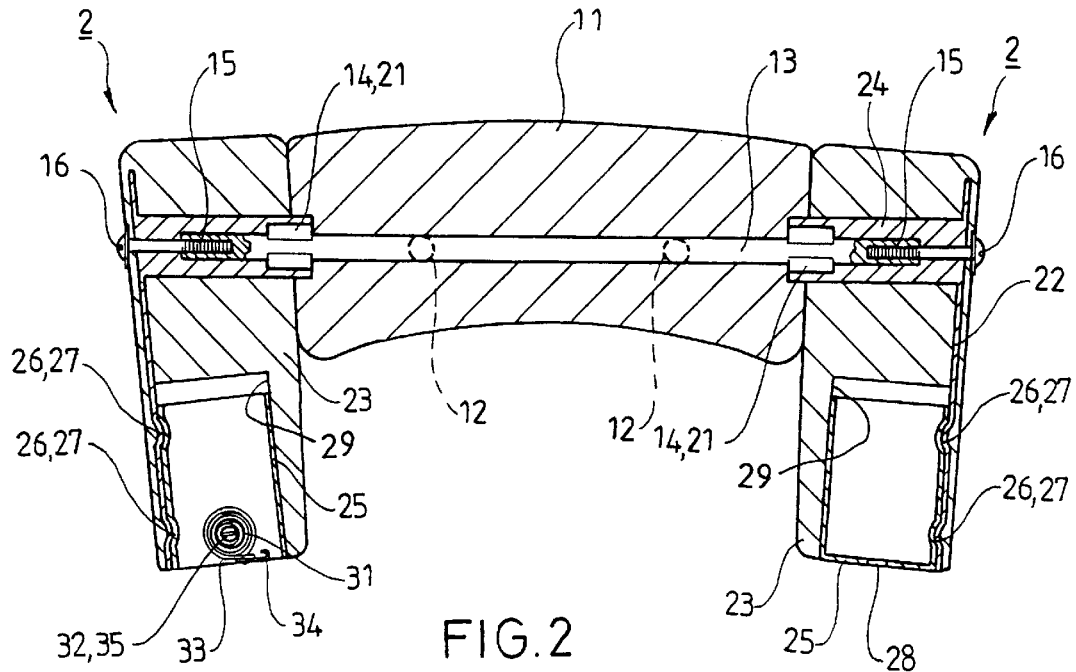
FIG. 2 is a horizontal sectional view of the pillow structure.

Referring to the drawings and initially to FIGS. 1 and 2, a pillow structure for a chair 1 in accordance with the present invention generally includes a main pillow 11 and two side pillows 2 mounted to two sides of the main pillow 11, respectively. The chair 10 includes two holes 12 defined in an upper side thereof for adjustably receiving two latch rods 17 extending downwardly from the main pillow 11 to allow adjustment in the height of the main pillow 11. The main pillow 11 is also adjustable in an inclination angle relative to the chair 1, which is conventional and therefore not further described.

The main pillow 11 further includes a rod 13 securely attached to each of two sides thereof Preferably, each rod 13 includes a non-circular portion. Namely, each rod 13 may include at least one key 14 formed on an outer side thereof In this embodiment, each side of the main pillow 11 includes a recess, and each rod 13 extends outwardly from a bottom wall that defines the associated recess. In addition, the key 14 of the rod 13 is in the recess. Each rod 13 further includes a threading 15 (in the form of a screw hole or outer threading) formed on a distal end thereof, which will be described later.

Each side pillow 2 includes a frame 22 covered by a padding member 23 made of soft material to support a side of the head of the user. As shown in FIG. 2, a sleeve 24 is mounted in an end of each side pillow 11 and has a bore (not labeled) for receiving an associated rod 13, and a fastener element 16 is provided to secure the rod 13 and the sleeve 24 together. In addition, an end opening 21 that is communicated with the bore of the sleeve 24 is fittingly engaged with an associated inner non-circular end of the rod 13. The sleeve 24 may extend in a direction having an angle of 80°~100° with a longitudinal axis of the side pillow 2. Namely, each side pillow 2 extends in a direction having an angle of 80°~100° with a longitudinal axis of the main pillow 1. By such an arrangement, the user's head is comfortably supported.

Figure 3:
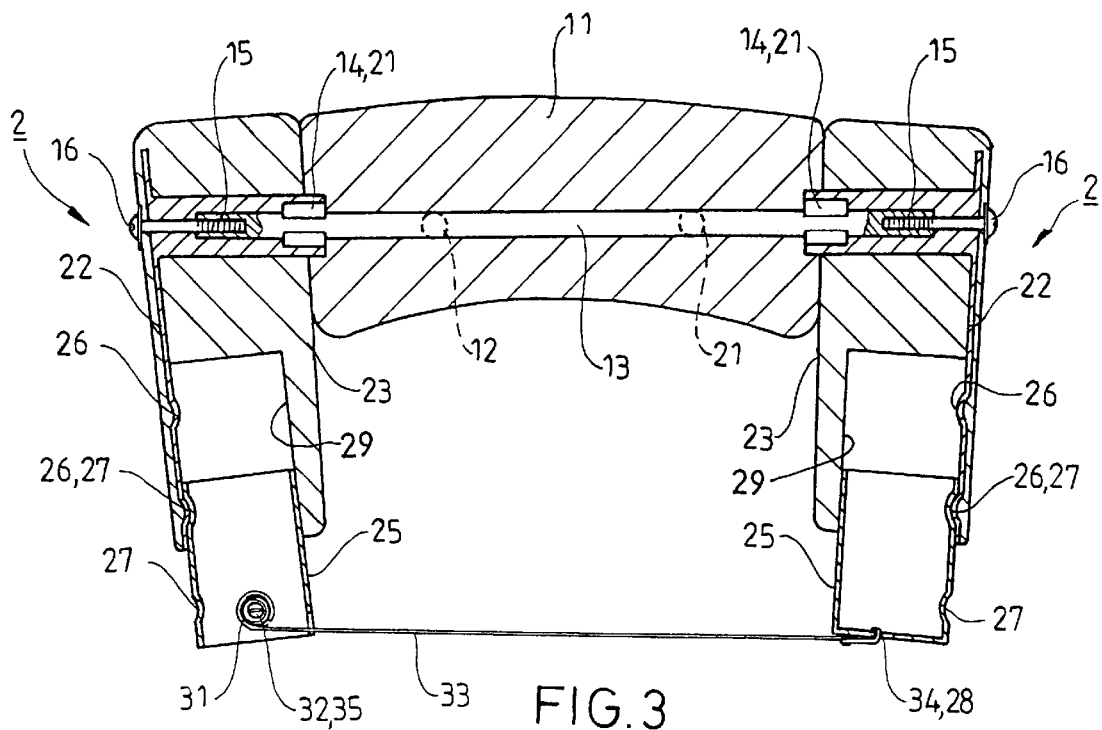
FIG. 3 is a view similar to FIG. 2, illustrating use of the pillow structure.

Each side pillow 2 further includes a compartment 29 defined in the other end thereof for telescopically receiving an extension 25. As shown in FIG. 3, an inner periphery that defines the compartment includes a number of protrusions 26 formed thereon, while a lateral side of the associated extension 25 includes at least one depression 27 for releasably engaging with one of the retaining protrusions 26 to retain the extension 25 in position. In addition, one of the extensions 25 (e.g., the left one) includes a reel 31 mounted thereon, and a belt 33 is mounted around the reel 31 and has a hook or latching member 34 at a distal end thereof for releasably engaging with a retaining slot 28 defined in the other extension 25. The reel 31 includes a spindle 32 mounted therein and to which an inner end of the belt 33 is attached, and a returning means 35 may be mounted around the reel 31 for returning the belt 33. The reel 31 and the belt 33 may be directly mounted to one side pillow 2, while the retaining slot 28 may be directly defined in the other side pillow 2.

In use, as shown in FIG. 2, the side pillows 2 provide a comfort support for the neck, the rear part, the right part, and the left part of the head of the user. The side pillows 2 are also adjustable in the height as they are securely attached to the main pillow 11 to move therewith. As a result, the user's head may have a comfort support even if he/she is taking a nap. Referring to FIG. 3, the extensions 25 of the side pillows 2 may be extended and retained in position. In addition, the belt 33 may be pulled and the latching member 34 can be securely engaged with the retaining slot 28. The belt 33 may be made of transparent material or light-tight material, and such an arrangement may be optionally applied to the driver's seat or a passenger's seat. The pillow structure of the present invention may be applied to chairs on vehicles, and the side pillows 2 and the belt 33 may function as a protective means when emergency stop or sudden turn occurs. In addition, the side pillows 2 and the belt 33 may filter a portion of light such that the user may have a good rest. Further, the overall cost of the pillow structure of the present invention is relatively low when compared to expensive air bags.

Although the invention has been explained in relation to its preferred embodiment, it is to be understood that many other possible modifications and variations can be made without departing from the spirit and scope of the invention as hereinafter claimed.

What is claimed is:

1. A pillow structure for a chair comprising a main pillow member adjustably mounted to the chair and two side pillows respectively mounted on two sides of the main pillow and extending in a direction transverse to the main pillow, each side pillow includes an extension telescopically received therein and slidable along the extending direction of an associated side pillow, and each side pillow further including a compartment for telescopically receiving an associated said extension, a lateral wall that defines the compartment including a plurality of protrusions formed thereon, and the associated extension including a depression selectively engaged with one of the protrusions for retaining the associated extension in position.

2. A pillow structure for a chair comprising a main pillow member adjustably mounted to the chair and two side pillows respectively mounted on two sides of the main pillow and extending in a direction transverse to the main pillow, one of the side pillows including a reel mounted thereon, the reel including a spindle therein and a belt wound therearound, the belt including an end securely attached to the spindle and a distal end with a hook, and the other of the side pillows including a retaining slot defined therein for releasably engaging the hook of the belt.

3. The pillow structure as claimed in claim 2, wherein the reel further includes a returning means mounted around the spindle for returning the belt when the hook is disengaged from the retaining slot.

4. The pillow structure as claimed in claim 2, wherein the belt is transparent.

5. The pillow structure as claimed in claim 2, wherein the belt is made of light-tight material.

6. A pillow structure for a chair comprising a main pillow member adjustably mounted to the chair and two side pillows respectively mounted on two sides of the main pillow and extending in a direction transverse to the main pillow, each side pillow including an extension telescopically received therein and slidable along the extending direction of an associated said side pillow, one of the extensions including a reel mounted thereon, the reel including a spindle therein and a belt wound therearound, the belt including an end securely attached to the spindle and a distal end with a hook, and the other of the extensions including a retaining slot defined therein for releasably engaging the hook of the belt.

7. The pillow structure as claimed in claim 6, wherein the reel further includes a returning means mounted around the spindle for returning the belt when the hook is disengaged from the retaining slot.

8. The pillow structure as claimed in claim 6, wherein the belt is transparent.

9. The pillow structure as claimed in claim 6, wherein the belt is made of light-absorbing material.

10. The pillow structure as claimed in claim 6, wherein each said side pillow extends in a direction having an angle of 80°~100° with a longitudinal axis of the main pillow.

* * * * *